(12) United States Patent
Shah et al.

(10) Patent No.: US 11,882,500 B2
(45) Date of Patent: Jan. 23, 2024

(54) SYSTEMS AND METHODS FOR TRACKING LUGGAGE IN A VEHICLE

(71) Applicant: Ford Global Technologies, LLC, Dearborn, MI (US)

(72) Inventors: Romil Shah, Santa Clara, CA (US); Sakthi Narayanan Balasubramanian, Tamil Nadu (IN); Anuja Anil Shirsat, Mountain View, CA (US); Sonal Doomra, Santa Clara, CA (US); Shounak Athavale, San Jose, CA (US)

(73) Assignee: Ford Global Technologies, LLC, Dearborn, MI (US)

( * ) Notice: Subject to any disclaimer, the term of this patent is extended or adjusted under 35 U.S.C. 154(b) by 255 days.

(21) Appl. No.: 17/086,697

(22) Filed: Nov. 2, 2020

(65) Prior Publication Data

US 2022/0141621 A1    May 5, 2022

(51) Int. Cl.

| | | |
|---|---|---|
| *H04W 4/029* | (2018.01) | |
| *G06T 7/00* | (2017.01) | |
| *G07C 9/00* | (2020.01) | |
| *G08B 21/24* | (2006.01) | |
| *G06K 9/00* | (2022.01) | |
| *G06Q 50/30* | (2012.01) | |
| *G06Q 50/28* | (2012.01) | |
| *G06N 3/02* | (2006.01) | |
| *B60R 25/30* | (2013.01) | |
| *B60R 25/25* | (2013.01) | |
| *B60R 25/01* | (2013.01) | |
| *G06V 40/16* | (2022.01) | |

(52) U.S. Cl.
CPC ............ *H04W 4/029* (2018.02); *B60R 25/01* (2013.01); *B60R 25/25* (2013.01); *B60R 25/305* (2013.01); *G06N 3/02* (2013.01); *G06Q 50/28* (2013.01); *G06Q 50/30* (2013.01); *G06T 7/0002* (2013.01); *G06V 40/172* (2022.01); *G07C 9/00571* (2013.01); *G07C 9/00896* (2013.01); *G08B 21/24* (2013.01); *G06Q 2240/00* (2013.01); *G06T 2207/30201* (2013.01); *G06T 2207/30242* (2013.01); *G07C 2009/0092* (2013.01)

(58) Field of Classification Search
CPC ........ G06N 3/02; G06T 7/0002; G06Q 50/30; G06Q 50/28; B60R 25/25; B60R 25/305; B60R 25/01; H04W 4/44; H04W 4/029; G06V 40/172; G06V 20/52; G07C 9/00571; G07C 9/00896; G08B 21/24
See application file for complete search history.

(56) References Cited

U.S. PATENT DOCUMENTS

| | | | |
|---|---|---|---|
| 10,173,643 B2 | 1/2019 | Myers et al. | |
| 10,303,961 B1 | 5/2019 | Stoffel et al. | |
| 2015/0166009 A1* | 6/2015 | Outwater | .............. B60R 25/302 |
| | | | 701/2 |
| 2017/0236092 A1* | 8/2017 | High | ................... G01C 21/343 |
| | | | 705/338 |
| 2018/0165636 A1* | 6/2018 | Wilkinson | .............. G06F 21/35 |

(Continued)

*Primary Examiner* — Yong Hang Jiang
(74) *Attorney, Agent, or Firm* — Brandon Hicks; Eversheds Sutherland (US) LLP (57) ABSTRACT

The disclosure provides systems and methods for tracking luggage. Luggage is tracked by associating the luggage with a user account during a loading action and during an unloading action. The system further includes systems and methods for retrieving lost luggage.

19 Claims, 7 Drawing Sheets

(56) References Cited

U.S. PATENT DOCUMENTS

| | | | |
|---|---|---|---|
| 2018/0224849 A1* | 8/2018 | Gordon | G06V 20/597 |
| 2018/0227393 A1* | 8/2018 | Daub | H04L 67/01 |
| 2018/0232739 A1* | 8/2018 | Battle | G06Q 20/1085 |
| 2018/0236975 A1* | 8/2018 | Myers | G06V 40/193 |
| 2018/0268712 A1* | 9/2018 | Lubeck | H04W 8/24 |
| 2018/0285635 A1* | 10/2018 | Arata | G06V 40/28 |
| 2019/0279487 A1 | 9/2019 | Hirose et al. | |
| 2020/0160075 A1* | 5/2020 | Muiter | G06V 20/64 |

\* cited by examiner

SYSTEMS AND METHODS FOR TRACKING LUGGAGE IN A VEHICLE

BACKGROUND

Autonomous vehicles, ride hail services, and cabs provide transportation to passengers carrying luggage or other articles. Quite often, the luggage or other articles are inadvertently left within the vehicle. For such lost items, it is difficult to identify the owner of the lost items and return the items to the owner. For example, the owner typically has to try to track down the items through customer service and by filling out forms. In many cases, this is ineffective because the items are hard to track down and the company may pay for the lost luggage rather than spend the time to find the items. In addition, there is a security issue if someone leaves a package or luggage on purpose. It is with respect to these and other considerations that the disclosure made herein is presented.

DESCRIPTION OF THE FIGURES

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

The disclosure provides systems and methods for tracking luggage. Luggage is tracked by associating the luggage with a user account during a loading action and during an unloading action. Because the luggage is automatically tracked, the system can further provide convenient options for retrieving lost or forgotten luggage.

An exemplary method includes creating a user account that includes facial features. When a ride is requested, the vehicle performs facial recognition at a pickup location to identify a user account that uniquely identifies the user. The vehicle then performs object detection to add the number of luggage items the user has to the account.

At the dropoff location, the vehicle again performs facial recognition to identify the user account that uniquely identifies the user and then performs object detection to identify how many pieces of luggage the user takes at dropoff. The system subtracts the number of luggage items the user takes at dropoff from the account (e.g., the number of items the user brought to the vehicle at pickup). If any luggage items are left in the vehicle, the system provides options for having the items delivered or storing the items in a locker for immediate access. These and other advantages of the present disclosure are provided in greater detail herein.

Illustrative Embodiments

The disclosure will be described more fully hereinafter with reference to the accompanying drawings, in which exemplary embodiments of the disclosure are shown, and not intended to be limiting.

Figure 1:
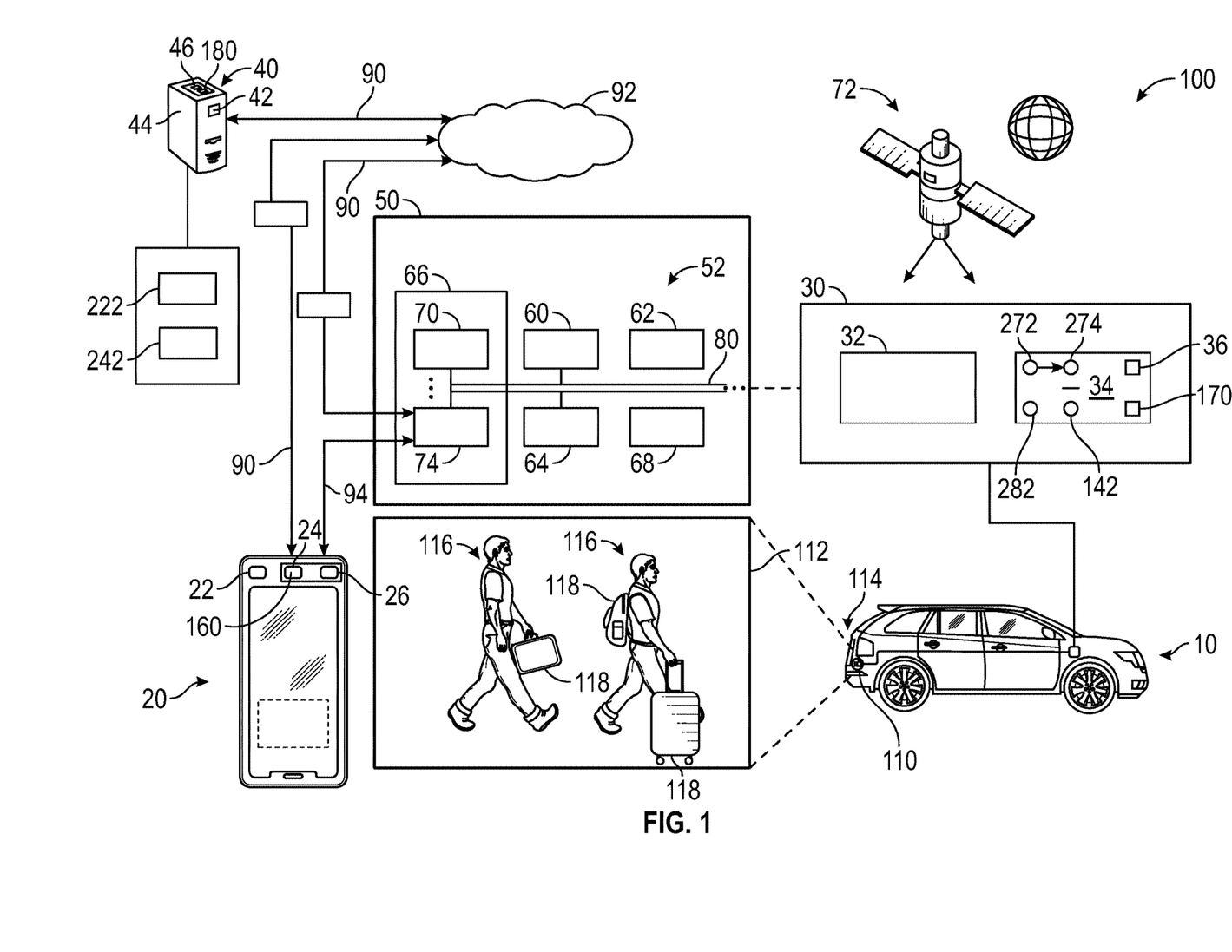
FIG. 1 illustrates an example functional schematic of a luggage tracking system 100 including a vehicle, a mobile device, and a server in accordance with the present disclosure.

FIG. 1 illustrates a vehicle 10, a mobile device 20, and a server 40 in communication with one another. Each of the vehicle 10, the mobile device 20, and the server 40 includes a processor, a memory, and an application including program instructions that, when executed by the processor, performs aspects of methods described in further detail below.

The mobile device 20 includes a processor 22 and a memory 24. The memory 24 stores a mobile device application 26 including program instructions that, when executed by the processor 22, perform aspects of the disclosed methods described in further detail below including creating a user account including facial features, requesting a vehicle 10, receiving notifications regarding luggage left in the vehicle 10, and selecting a luggage retrieval option. As such, the mobile device 20 and mobile device application 26 may be part of a luggage tracking system 100 described in further detail below including transmitting information for such systems.

The server 40 (e.g., one or more servers) may be part of a cloud-based computing infrastructure, and may be associated with and/or include a Telematics Service Delivery Network (SDN) that provides digital data services to the vehicle 10 and mobile device 20. The server 40 includes a processor 42 and a memory 44. The memory 44 includes a server application 46 including program instructions that, when executed by the processor 42, performs aspects of the disclosed methods described in further detail below including storing and transmitting user account information, coordinating a vehicle 10 for a passenger including transmitting a ride request to a vehicle 10, performing computation for facial recognition methods, and coordinating luggage pickup and delivery operations. As such, the server 40 and server application 46 may be part of the luggage tracking system 100 described in further detail below or may transmit information for such systems.

The vehicle 10 includes an automotive computer 30. The automotive computer 30 includes a processor 32 and a memory 34. The memory 34 includes a vehicle application 36 including program instructions that, when executed by the processor 32, performs aspects of the disclosed methods described in further detail below including providing a ride service, confirming the identification of a rider, performing object detection to determine a number of luggage items associated with the rider and loaded into the vehicle 10 at a pickup location, and determining if the luggage items associated with the rider are removed from the vehicle 10 at a dropoff location. As such, the automotive computer 30 and vehicle application 36 may be part of the luggage tracking system 100 described in further detail below or may transmit information for such systems.

The memory 24, 34, 44 may be a non-transitory computer-readable memory storing program code. The memory can include any one or a combination of volatile memory elements (e.g., dynamic random access memory (DRAM), synchronous dynamic random access memory (SDRAM), etc.) and can include any one or more nonvolatile memory elements (e.g., erasable programmable read-only memory (EPROM), flash memory, electronically erasable programmable read-only memory (EEPROM), programmable read-only memory (PROM), etc.

Although illustrated as a car, the vehicle 10 may take the form of another passenger or commercial automobile such as, for example, a truck, a sport utility, a crossover vehicle, a van, a minivan, a taxi, a bus, etc., and may be configured to include various types of automotive drive systems. Example drive systems can include various types of internal combustion engine (ICE) powertrains having a gasoline, diesel, or natural gas-powered combustion engine with conventional drive components such as a transmission, a drive shaft, a differential, etc.

In another configuration, the vehicle 10 may be configured as an electric vehicle (EV). More particularly, the vehicle 10 may include a battery EV (BEV) drive system. The vehicle 10 may be configured as a hybrid EV (HEV) having an independent onboard power plant or a plug-in HEV (PHEV) that includes a HEV powertrain connectable to an external power source (including a parallel or series hybrid powertrain having a combustion engine power plant and one or more EV drive systems). HEVs can include battery and/or super capacitor banks for power storage, flywheel power storage systems, or other power generation and storage infrastructure.

The vehicle 10 may be further configured as a fuel cell vehicle (FCV) that converts liquid or solid fuel to usable power using a fuel cell, (e.g., a hydrogen fuel cell vehicle (HFCV) powertrain, etc.) and/or any combination of these drive systems and components.

Although the vehicle 10 may be a manually driven vehicle or operate in one or more partial autonomy modes, for purposes of teaching, the vehicle 10 is described herein as operating in a fully autonomous (e.g., driverless) mode. Examples of partial or full autonomy modes are widely understood in the art as autonomy Levels 1 through 5.

The vehicle 10 includes a Vehicle Controls Unit (VCU) 50. The VCU 50 includes a plurality of electronic control units (ECUs) 52 disposed in communication with the automotive computer 30. The automotive computer 30 may be or include an electronic vehicle controller. The automotive computer 30 and the VCU 50 may be installed in an engine compartment of the vehicle 10 (as schematically illustrated) or elsewhere in the vehicle 10.

The ECUs 52 may control aspects of vehicle operation and communication using inputs from human drivers, inputs from a vehicle system controllers, and/or via wireless signal inputs received via wireless channel(s) from other connected devices such as a mobile device, among others. The ECUs 52 (e.g., when configured as nodes in a CAN bus 80 described in further detail below) may each include a central processing unit (CPU), a CAN controller, and/or a transceiver (not shown in FIG. 1).

The VCU 50 may coordinate the sharing of data between vehicle systems, connected servers (e.g., server 40) and devices (e.g., mobile device 20). The VCU 50 can include or communicate with any combination of the ECUs 52, such as, for example, a Body Control Module (BCM) 60, an Engine Control Module (ECM) 62, a Transmission Control Module (TCM) 64, a Telematics Control Unit (TCU) 66, a Restraint Control Module (RCM) 68, and the like. The ECUs 52 described with respect to the VCU 50 are provided for exemplary purposes only, and are not intended to be limiting or exclusive. Control and/or communication with other control modules not shown in FIG. 1 is possible, and such control is contemplated.

The ECUs 52 can communicate with one another and the automotive computer 30 by way of a Controller Area Network (CAN) bus 80. Accordingly, the automotive computer 30 may retrieve information from, send information to, and otherwise interact with the ECUs 52 to perform steps described according to embodiments of the present disclosure.

The CAN bus 80 may be configured as a multi-master serial bus standard for connecting two or more of the ECUs 52 as nodes using a message-based protocol that can be configured and/or programmed to allow the ECUs 52 to communicate with each other. The CAN bus 80 may be or include a high speed CAN (which may have bit speeds up to 1 Mb/s on CAN, 5 Mb/s on CAN Flexible Data Rate (CAN FD)), and can include a low-speed or fault tolerant CAN (up to 125 Kbps), which may, in some configurations, use a linear bus configuration.

The CAN bus 80 may connect CAN bus nodes (e.g., the ECUs 52) to each other through a two-wire bus, which may be a twisted pair having a nominal characteristic impedance. The CAN bus 80 may also be accomplished using other communication protocol solutions, such as Media Oriented Systems Transport (MOST) or Ethernet. In other aspects, the CAN bus 80 may be a wireless intra-vehicle CAN bus.

ECUs 52 are now described in further detail.

The BCM 60 generally includes an integration of sensors, vehicle performance indicators, and variable reactors associated with vehicle systems. The BCM 60 may include processor-based power distribution circuitry that can control functions associated with the vehicle body such as lights, windows, security, door locks and access control, and various comfort controls. The BCM 60 may also operate as a gateway for bus and network interfaces to interact with remote ECUs (not shown in FIG. 1).

The BCM 60 may coordinate any one or more functions from a wide range of vehicle functionality, including energy management systems, alarms, vehicle immobilizers, ignition systems, driver and rider access authorization systems, Phone-as-a-Key (Paak) systems, driver assistance systems, Autonomous Vehicle (AV) control systems, power windows, doors, actuators, and other functionality, etc. The BCM 60 may be configured for vehicle energy management, exterior lighting control, wiper functionality, power window and door functionality, heating ventilation and air conditioning systems, and driver integration systems. In other aspects, the BCM 60 may control auxiliary equipment functionality, and/or is responsible for integration of such functionality. In one aspect, the luggage tracking system 100 may integrate the system using, at least in part, the BCM 60.

The TCU 66 can be configured to provide vehicle connectivity to wireless computing systems onboard and offboard the vehicle 10 and is configurable for wireless communication between the vehicle 10 and other systems, computers, and modules. For example, the TCU 66 includes a Navigation (NAV) system 70 for receiving and processing a GPS signal from a GPS 72, a Bluetooth® Low-Energy Module (BLEM) 74, a Wi-Fi transceiver, an Ultra-Wide Band (UWB) transceiver, and/or other wireless transceivers (not shown in FIG. 1).

The NAV system 70 is configured and/or programmed to determine a position of the vehicle 10. The NAV system 70 includes a Global Positioning System (GPS) receiver configured or programmed to triangulate a position or vehicle location of the vehicle 10 relative to satellites or terrestrial based transmitter towers associated with the GPS 72. The NAV system 70, therefore, is configured or programmed for wireless communication.

The NAV system 70 may be further configured or programmed to develop routes from a current vehicle location to a selected destination, as well as display a map and present driving directions to the selected destination. In some instances, the NAV system 70 may develop the route according to a user preference. Examples of user preferences may include maximizing fuel efficiency, reducing travel time, travelling the shortest distance, or the like. In particular, the NAV system 70 determines a route from a pickup location to a dropoff location and determines when the vehicle 10 is at the pickup location or the dropoff location.

In addition, the TCU 66 generally includes wireless transmission and communication hardware that may be disposed in communication with one or more transceivers associated with telecommunications towers and other wireless telecommunications infrastructure. For example, the BLEM 74 is configured and/or programmed to receive messages from, and transmit messages to, one or more cellular towers associated with a telecommunication provider, and/or and a Telematics Service Delivery Network (SDN) associated with the vehicle 10 for coordinating vehicle fleet (not shown in FIG. 1).

The BLEM 74 may establish wireless communication using Bluetooth® and Bluetooth Low-Energy® communication protocols by broadcasting and/or listening for broadcasts of small advertising packets, and establishing connections with responsive devices that are configured according to embodiments described herein. For example, the BLEM 74 may include Generic Attribute Profile (GATT) device connectivity for client devices that respond to or initiate GATT commands and requests, and connect directly, with a mobile device 20.

The mobile device 20 and the server 40 can connect to the vehicle 10 according to systems and methods described above. The vehicle 10, the mobile device 20, and the server 40 also connect to one another through various communication channels.

The mobile device 20 may connect with the vehicle 10 using wired and/or wireless communication protocols and transceivers. The mobile device 20 may be communicatively coupled with the vehicle 10 via one or more networks 92, which may communicate via one or more wireless channels 90, and may connect with the vehicle 10 directly (e.g., channel 94) using near field communication (NFC) protocols, Bluetooth® protocols, Wi-Fi, Ultra-Wide Band (UWB), and other possible data connection and sharing techniques. The vehicle 10 also receives and/or is in communication with the Global Positioning System (GPS) 72.

In some aspects, the mobile device 20 may communicate with the vehicle 10 through the one or more wireless channels 90, which may be encrypted and established between the mobile device 20 and the Telematics Control Unit (TCU) 66. The mobile device 20 may communicate with the TCU 66 using a wireless transmitter associated with the TCU 66 on the vehicle 10. The transmitter may communicate with the mobile device 20 using a wireless communication network such as, for example, the one or more networks 92.

The mobile device 20 and the server 40 may be in direct communication via the wireless channels 90 connected by the one or more networks 92, and also in indirect communication (e.g., channel 94) via the vehicle 10.

The networks 92 illustrate an example communication infrastructure in which the connected devices discussed in various embodiments of this disclosure may communicate. The networks 92 may be and/or include the Internet, a private network, public network or other configuration that operates using any one or more known communication protocols such as, for example, transmission control protocol/Internet protocol (TCP/IP), Bluetooth®, Wi-Fi based on the Institute of Electrical and Electronics Engineers (IEEE) standard 802.11, Ultra-Wide Band (UWB), and cellular technologies such as Time Division Multiple Access (TDMA), Code Division Multiple Access (CDMA), High Speed Packet Access (HSPDA), Long-Term Evolution (LTE), Global System for Mobile Communications (GSM), and Generation (5G), to name a few examples.

The vehicle 10 includes a camera 110 (e.g., one or more cameras) that provides an image 112 or video to the automotive computer 30. The camera 110 may be directed to an area around a trunk 114 or storage area of the vehicle 10 so as to capture an image 112 of a user 116 loading luggage items 118 into the trunk 114. The image 112 is analyzed by facial feature algorithms and by object detection algorithms as described in further detail below.

Figure 2:
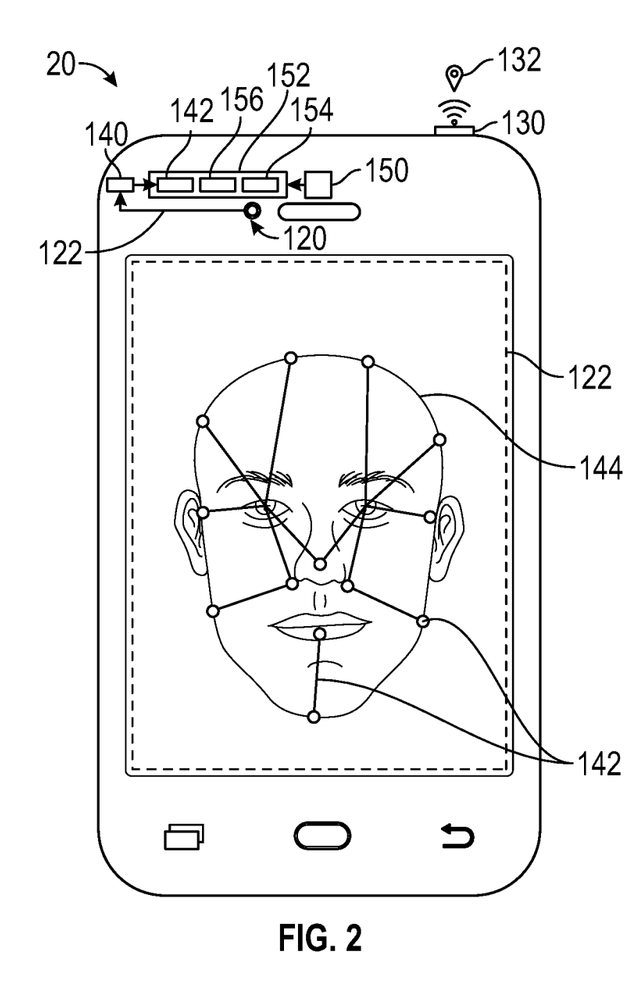
FIG. 2 is a schematic illustration of the mobile device of FIG. 1 in accordance with the present disclosure.

Referring to FIG. 2, the mobile device 20 includes a camera 120 that provides an image 122 or video and a GPS sensor 130 that provides a location 132 of the mobile device 20.

The mobile device application 26 further includes a facial feature extraction module 140 that determines facial features 142 from the image 122 of a face 144 provided by the camera 120. For example, the facial feature extraction module 140 requests and receives an image 122 from the camera 120, applies a facial feature algorithm to the image 122 to generate the facial features 142, encodes the facial features 142 for security, and saves the facial features 142 to an account described in further detail below. The facial feature extraction can be done locally on the mobile device to safeguard personally identifiable information (PII) and improve privacy.

The facial feature algorithm of the facial feature extraction module 140 may include a face detection algorithm to identify a face. The facial feature algorithm may then determine the position, size, and pose of the head. The facial feature algorithm may then extract the face 144 from the rest of the image 122.

The facial feature algorithm then identifies and measures facial features 142 of the face 144. For example, the facial features algorithm can identify facial features 142 by identifying nodal points on the user's face and measuring the distance between certain nodal points. The measured distances can include the distance between the eyes, the width of the nose, the length of the jaw line, and other distances that represent facial features including eyes, eye sockets, chins, noses, eyebrows, hairlines, lip features, ears, and cheek structure. The mathematical representation of a combination of the measured distances are a unique code (e.g., referred to as a faceprint) that can be stored in a database and compared to facial feature data collected from other images to identify a person as described in further detail below.

Figure 3:
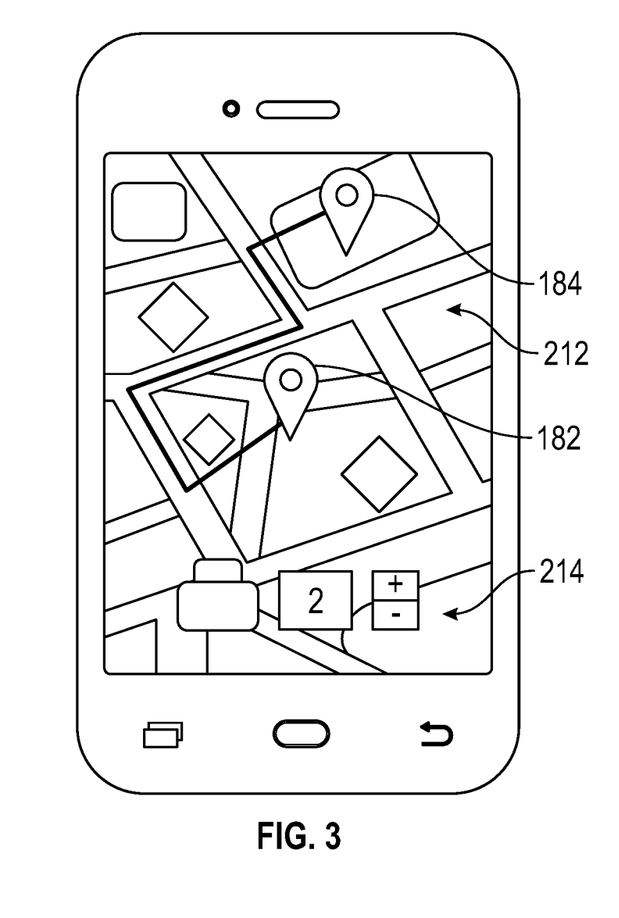
FIG. 3 is a schematic illustration of the mobile device of FIG. 1 in accordance with the present disclosure.

The mobile device application 26 further includes an account creation module 150 that causes the mobile device 20 to create a user account 152 including the facial features 142 and an account identification number 154. For example, the account creation module 150 creates the user account 152 identified by the account identification number 154 and instructs the facial feature extraction module 140 to generate the facial features 142 and store the facial features 142 the user account 152 as described above. The account 152 further includes (e.g., receives and stores) contact information 156 including a phone number, email address, physical address, and the like. The mobile device application 26 sends the user account 152 to the server 40, which stores the user account 152 with a database of accounts of different users.

The mobile device application 26, the vehicle application 36, and the server application 46 include ride coordination modules 160, 170, 180 respectively, to request a vehicle 10 for transportation from a pickup location 182 to a dropoff location 184 and track the loading and unloading of luggage items 118 for the vehicle 10.

Figure 4:
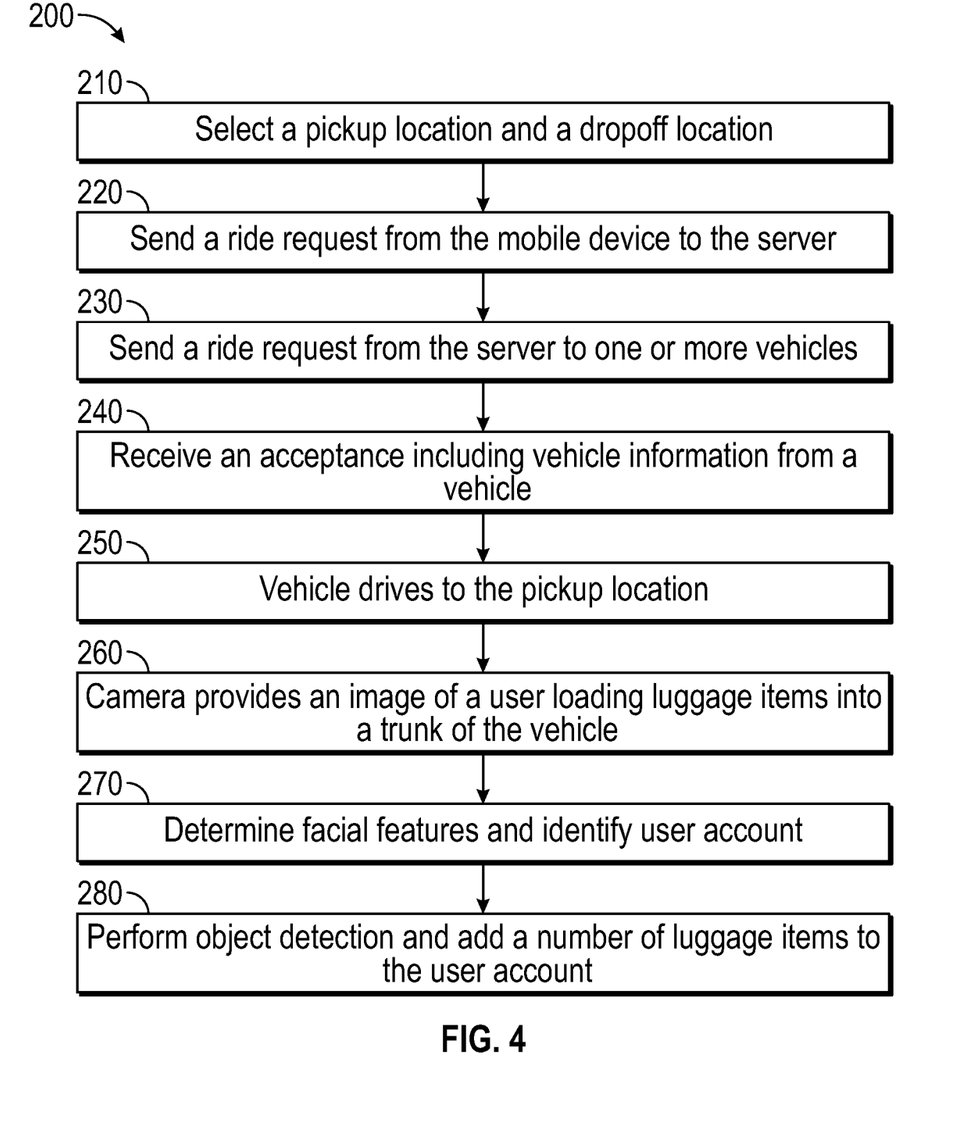
FIG. 4 is a flow chart of a method of requesting a vehicle and monitoring the loading of luggage items by a user into the vehicle at a start location.

The modules 160, 170, 180 include computer executable instructions that, when executed by the processor 22, 32, 42 cause the processor of the mobile device 20, the automotive computer 30, and the server 40 to perform aspects of a method 200 of requesting a vehicle 10 and monitoring the loading of luggage items 118 in the vehicle 10 at the pickup location 182.

According to a first step 210, the module 160 displays a map 212 on which the pickup location 182 and the dropoff location 184 are selected and/or displayed. The pickup location 182 may be the location 132 of the mobile device 20 as provided by the GPS sensor 130. Each of the pickup location 182 and/or the dropoff location 184 may be a selected result from a list of results generated by entering one or more keywords or an address into a search engine.

The module 160 may further generate a user interface input 214 that is configured to receive a number of luggage items 118.

According to a second step 220, the mobile device 20 sends to the server 40 as part of a ride request: ride information 222 including the account identification number 154, the pickup location 182, and the dropoff location 184. The server 40 stores the ride information 222, identifies the user account 152 based on the account identification number 154, and associates the ride information 222 with the user account 152.

In some cases, the ride request may be for a group of passengers. Here, each passenger or multiple passengers may have a user account 152 and the ride request may include account identification numbers 154 for each user 116. Each of the user accounts 152 includes stored facial features 142. The stored facial features are unique and correspond to the users.

According to a third step 230, the server 40 sends to the vehicle 10 (e.g., one or more vehicles 10) as a ride request: the ride information 222 including the pickup location 182 and the dropoff location 184. For example, the vehicle 10 provides an indication of whether the vehicle 10 is in use and the NAY system 70 of the vehicle 10 provides a vehicle location to the server 40. The server 40 identifies vehicles 10 that are not in use and are within a minimum or threshold distance or time to the pickup location 182 and sends the ride request to those vehicles 10.

According to a fourth step 240, the server 40 receives an acceptance of the ride request from one of the vehicles 10 along with a vehicle identification number 242. The server 40 associates or stores the vehicle identification number 242 with the ride information 222. The server 40 then sends additional information from the user account 152 to the vehicle 10 including the facial features 142.

According to a fifth step 250, the NAV system 70 of the vehicle 10 generates a route from a current location of the vehicle 10 to the pickup location 182. The AV systems of the vehicle 10 drive the vehicle 10 to the pickup location 182.

Figure 5:
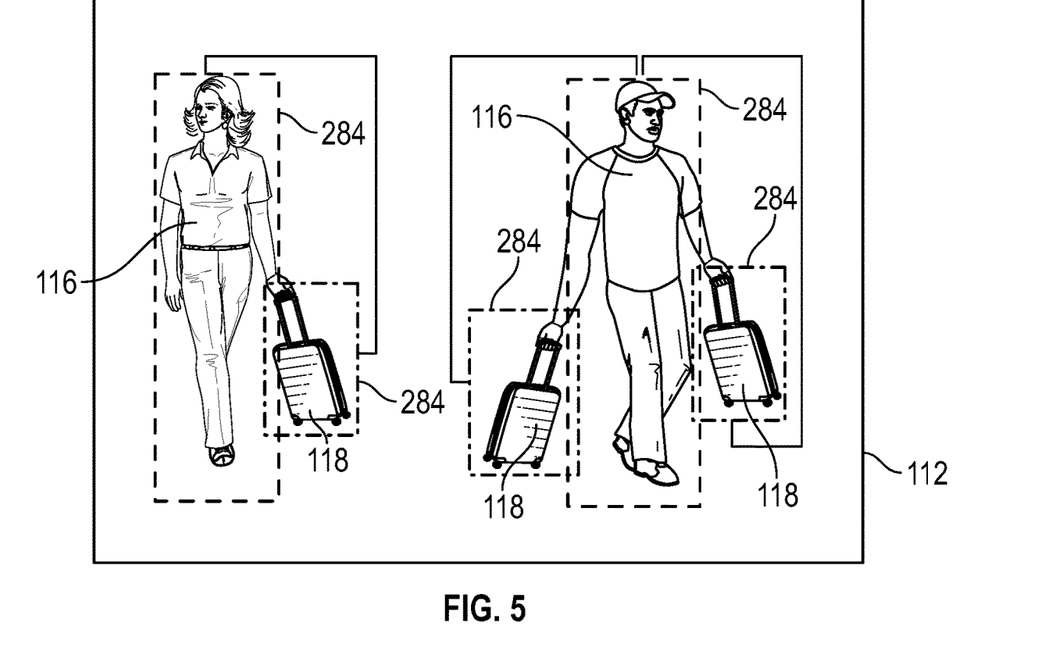
FIG. 5 is a schematic illustration of an example method of object detection.

Referring to FIGS. 1 and 5, according to a sixth step 260, at the pickup location 182, the camera 110 of the vehicle 10 provides an image 112 of a user 116 loading luggage items 118 into the trunk 114.

According to a seventh step 270, the image 112 is analyzed by a facial feature extraction module 272. Although the analysis of the image 112 can be performed by the server 40 or in another location, for purposes of teaching, the analysis of the image 112 is performed by the vehicle 10. For example, the vehicle application 36 includes or accesses the facial feature extraction module 272.

The facial feature extraction module 272 determines facial features 274 from the image 112 and compares the facial features 274 from the image 112 to the facial features 142 from the server 40 (e.g., in the user account 152).

For example, the facial feature extraction module 272 calculates a probability match score between the facial features 274 and the facial features 142 (or for all facial features stored in a database). If the probability match score is above a threshold score, the facial features 274 are considered to match the facial features 142.

If the facial features 274 match the facial features 142, according to an eighth step 280, the image 112 is analyzed by an object detection module 282. Although the analysis of the image 112 can be performed by the server 40 or in another location, for purposes of teaching, the analysis of the image 112 is performed by the vehicle 10. For example, the vehicle application 36 includes or accesses the object detection module 282.

Referring to FIG. 5, the object detection module 282 locates and identifies a user 116 associated with the facial features 274 and a number of luggage items 118 associated with the user 116. The number of luggage items 118 associated with the user 116 and images of the luggage items 118 are added to the ride information 222 of the server 40.

Steps 270, 280 may be performed for additional users 116 with user accounts 154 associated with the ride request.

The vehicle 10 may additionally include a trunk camera that confirms that the luggage items 118 are placed in the trunk 114. For example, the object detection module 282 compares characteristics of luggage items 118 in the image 112 from the camera 110 to characteristics of luggage items 118 in an image from the trunk camera. Or, the object detection module 282 monitors the timing in which luggage items 118 leave the image 112 and appear in the image from the trunk camera.

The object detection module 282 performs object localization and image classification functions. Object detection may be performed using a variety of methods for determining bounding boxes. For example, the object detection may use Convolutional Neural Networks (CNN), Region-Based Convolutional Neural Networks (RCNN), fast RCNN, faster RCNN, you only look once (YOLO), and the like.

The object detection module 282 uses object localization algorithms and image classification algorithms. The object localization algorithm locates the presence of objects in the image 112 and indicates the presence of the object with a bounding box 284. For example, the location of each bounding box 284 is defined by a point and each bounding box 284 has a width and a height. The image classification algorithm predicts the type or class (e.g., people or luggage) of the object in the bounding box 284.

Figure 6:
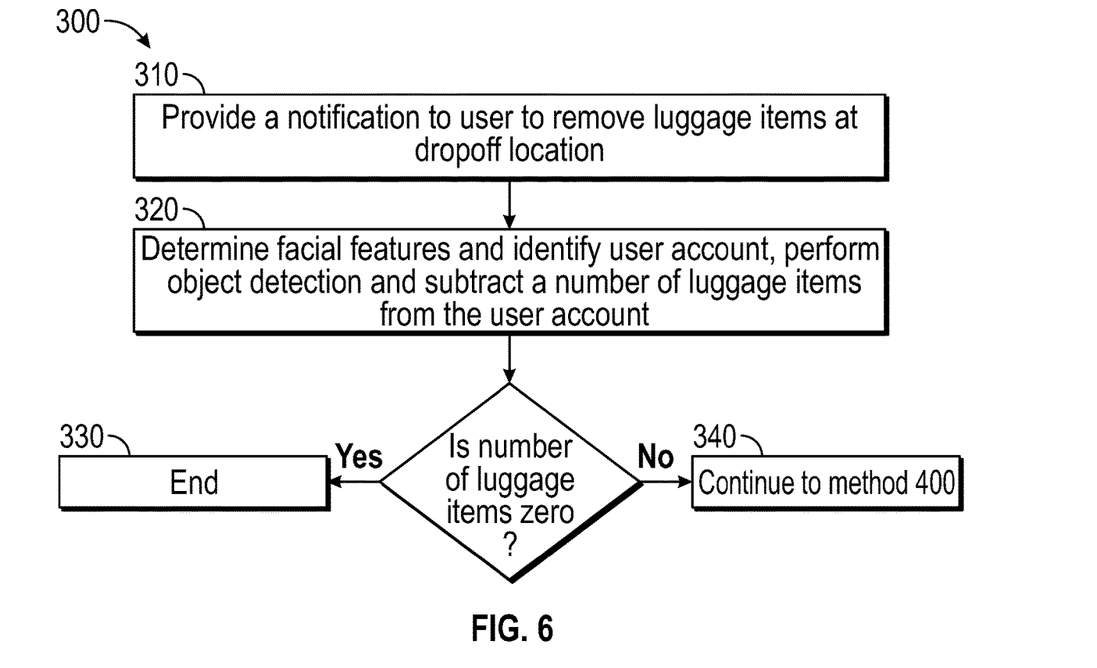
FIG. 6 is a flow chart of a method of monitoring the removal of luggage items from the vehicle by the user at an end location.

Referring to FIG. 6, the modules 160, 170, 180 include computer executable instructions that, when executed by the processor 22, 32, 42 cause the processor of the mobile device 20, the automotive computer 30, and the server 40 to perform aspects of a method 300 of monitoring the removal of luggage items 118 by the user 116 at the dropoff location 184.

According to a first step 310, prior to arriving at the dropoff location 184, the mobile device 20 receives or generates a notification and provides the notification to the user 116 via the mobile device 20. For example, the notification may be a visual notification on a screen of the mobile device 20, a sound, a vibration or haptic signal, combinations thereof, and the like. The notification is a first reminder to remove the luggage items 118 upon arrival at the dropoff location 184.

In addition, upon arriving at the dropoff location 184, the mobile device 20 receives or generates a notification and provides the notification via the mobile device 20 as a second reminder to remove the luggage items 118.

According to a second step 320, at the dropoff location 184, the steps 270, 280 are repeated as the user 116 removes the luggage items 118 from the trunk 114. In particular, the facial feature extraction module 272 again determines facial features 274 from the image 112 and compares the facial features 274 from the image 112 to the facial features 142 from the server 40.

If the facial features 274 match the facial features 142, the image 112 is analyzed by an object detection module 282. The object detection module 282 determines a user 116 associated with the facial features 274 and a number of luggage items 118 associated with the user 116. The number of luggage items 118 associated with the user 116 are subtracted from the number of luggage items 118 that were previously added to the ride information 222 of the server 40 to determine a left number of luggage items 118.

Figure 7:
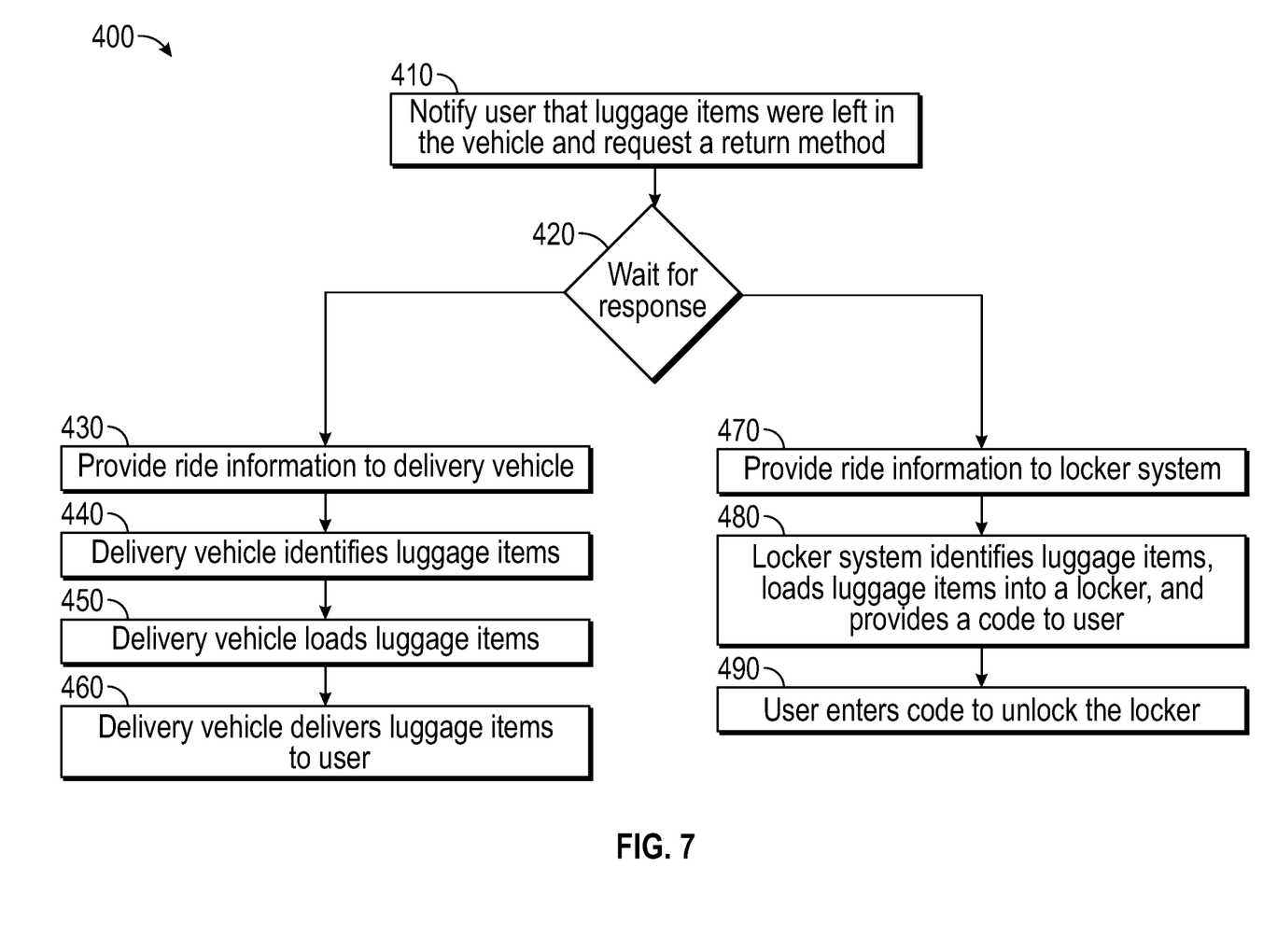
FIG. 7 is a flow chart of a luggage retrieval method.

If the left number of luggage items 118 is zero, the method 300 ends at a step 330. If the left number of luggage items 118 is non-zero (i.e., one or more), at a step 340, the vehicle 10 waits for a period of time before leaving. During the waiting period, the steps 310, 320 may be repeated. If the period of time expires before the method 300 ends at step 330, as a step 340, a luggage retrieval method 400 is performed.

Referring to FIG. 7, the modules 160, 170, 180 include computer executable instructions that, when executed by the processor 22, 32, 42 cause the processor of the mobile device 20, the automotive computer 30, and the server 40 to perform aspects of the luggage retrieval method 400.

According to a first step 410, upon leaving the dropoff location 184, the mobile device 20 receives or generates a notification and provides the notification via the mobile device 20 to inform the user 116 that a left number of luggage items 118 were not removed from the vehicle 10. The notification includes a request for a response as to whether to (1) drop off the left number of luggage items 118 at a locker system 600 or (2) request delivery of the left number of luggage items 118 by a delivery vehicle 500.

According to a second step 420, the system 100 may wait for a response for a period of time. If a response is not received, the system 100 defaults to dropping off the left number of luggage items 118 at the locker system 600. The system 100 may also determine the availability of the delivery vehicle 500 and, if the delivery vehicle 500 is unavailable, default to dropping off the left number of luggage items 118 at the locker system 600.

According to a third step 430, if the user 116 requests that the delivery vehicle 500 deliver the left number of luggage items 118, the server 40 provides to the delivery vehicle 500 information from the account 152 including contact information 146 (e.g., physical address) ride information 222 including images of the luggage items 118 and the number of luggage items 118 that were left.

Figure 8:
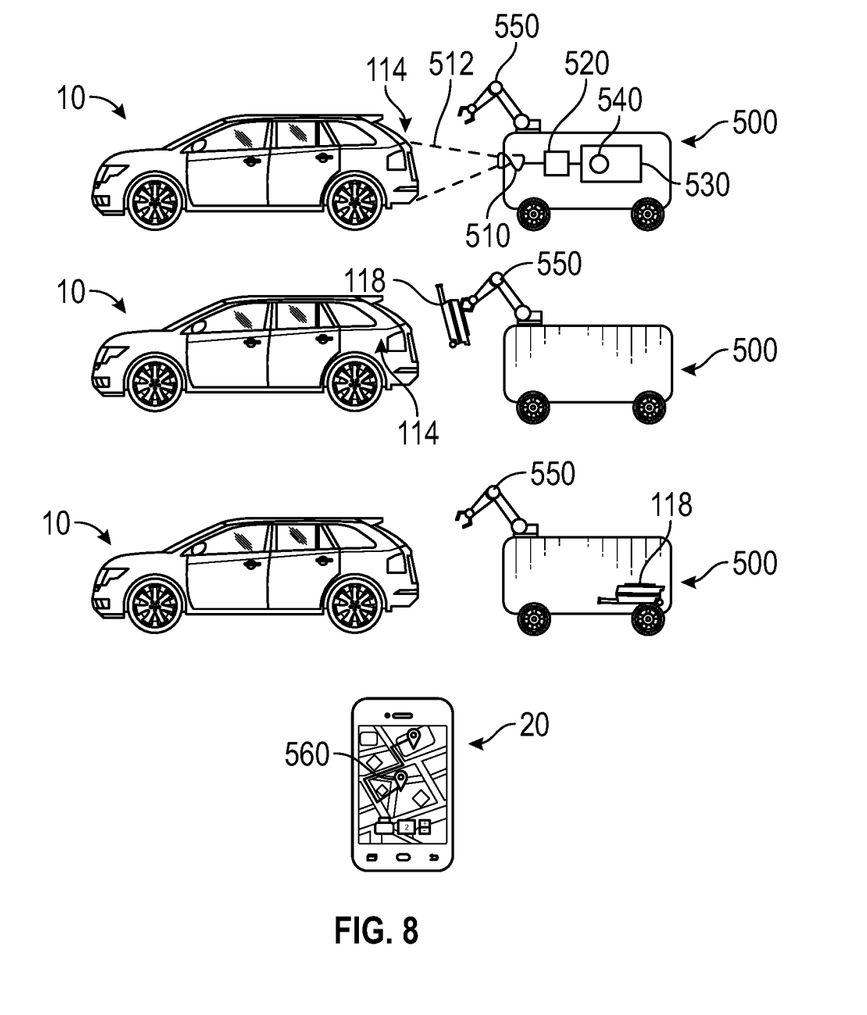
FIG. 8 is a schematic illustration of a delivery vehicle.

Referring to FIG. 8, according to a fourth step 440, the delivery vehicle 500 identifies the luggage items 118. For example, the delivery vehicle 500 may include a camera 510, a processor 520, a memory 530, and an object detection algorithm 540 (e.g., as described above for the vehicle 10) to identify the luggage items 118 and confirm the number and specific ones of the luggage items 118 by comparing the identified luggage items 118 in an image 512 of the camera 510 to images of the luggage items 118 provided by the server 40 in the ride information 222.

According to a fifth step 450, the delivery vehicle 500 may include a robotic arm 550 for removing luggage items 118 that are identified at step 440.

The delivery vehicle 500 may further include a NAV system and autonomous driving systems. According to a sixth step 460, the delivery vehicle 500 generates a route from the current location to the physical address of the user (or the dropoff location) and the delivery vehicle 500 follows the route to deliver the luggage items 118 to the user 116. The delivery vehicle 500 may provide a location 560 of the delivery vehicle 500 to the mobile device 20 so that the user 116 can track the progress of the delivery.

Figure 9:
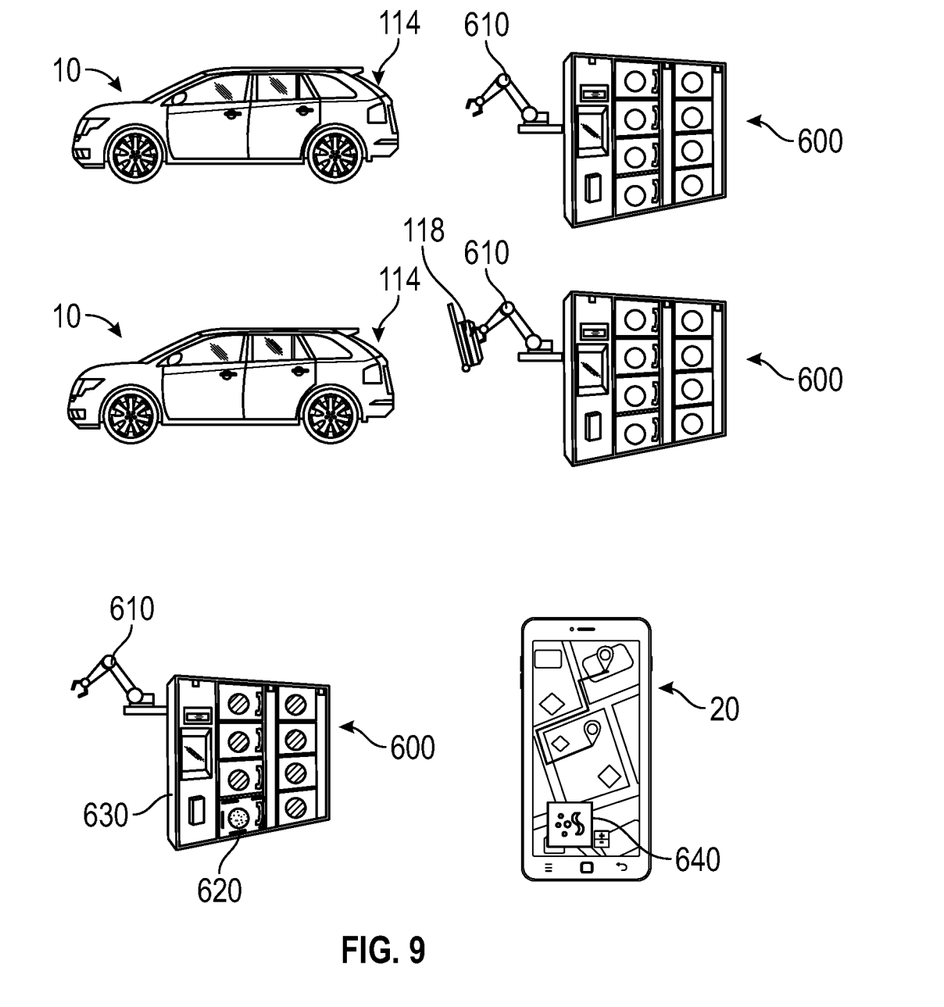
FIG. 9 is a schematic illustration of a locker system.

Referring to FIG. 9, according to a seventh step 470, if the user 116 requests that the vehicle 10 drop off the left number of luggage items 118 at the locker system 600, the server 40 provides to the locker system 600 information from the account 152 including ride information 222 including images of the luggage items 118 and the left number of luggage items 118.

The locker system 600 may include a camera, a processor, a memory, and an object detection algorithm (e.g., as described above for the delivery vehicle 500) to identify the luggage items 118 and confirm the number and specific ones of the luggage items 118 by comparing the identified luggage items 118 in an image of the camera to images of the luggage items 118 provided by the server 40 in the ride information 222.

The locker system 600 may include a robotic arm 610 for removing identified luggage items 118 from the vehicle 10. According to an eighth step 480, the locker system includes a plurality of storage lockers 620 and the luggage items 118 are placed and locked in a storage locker 620.

The locker system 600 further includes a user interface 630 that is configured to allow a user 116 to unlock the storage locker 620. The storage locker 620 is associated with the account 152. In particular, a code 640 (e.g., a numerical code or QR code) for accessing the storage locker 620 via the user interface 630 is provided to the mobile device 20 of the user 116.

According to a ninth step 490, the code 640 is entered via the user interface 630 (e.g., entered via typepad or scanned via camera) to unlock the storage locker 620 and access the luggage items 118.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a feature, structure, or characteristic is described in connection with an embodiment, one skilled in the art will recognize such feature, structure, or characteristic in connection with other embodiments whether or not explicitly described.

It should also be understood that the word "example" as used herein is intended to be non-exclusionary and non-limiting in nature. More particularly, the word "exemplary" as used herein indicates one among several examples, and it should be understood that no undue emphasis or preference is being directed to the particular example being described.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, nonvolatile media and volatile media. Computing devices may include computer-executable instructions, where the instructions may be executable by one or more computing devices such as those listed above and stored on a computer-readable medium.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating various embodiments and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

What is claimed is:

1. A method, comprising:
    creating a first user account, associated with a first user, comprising one or more first stored facial features of the first user;
    capturing a first image of the first user by a first camera of a vehicle at a pickup location;
    identifying the first user account based on the first image, comprising:
        detecting, in the first image, the first user;
        determining one or more first facial features of the first user from the first image; and
        comparing the one or more first facial features of the first user to the one or more first stored facial features of the first user account;
    adding a first number of luggage items associated with the first user to the first user account, comprising:
        determining, in the first image, the first user based on the one or more first facial features; and
        detecting, in the first image, the first number of luggage items associated with the first user;
    capturing a second image of the first user by the first camera at a dropoff location;
    identifying the first user account based on the second image, comprising:
        detecting, in the second image, the first user;
        determining one or more second facial features of the first user from the second image; and
        comparing the one or more second facial features of the first user to the one or more first stored facial features of the first user account;
    subtracting a second number of luggage items associated with the first user from the first user account, comprising:
        determining, in the second image, the first user based on the one or more second facial features; and
        detecting, in the second image, the second number of luggage items associated with the first user;
    determining a left number of luggage items associated with the first user, wherein the left number of luggage items is equal to the first number of luggage items minus the second number of luggage items; and
    sending a notification to a mobile device associated with the first user if the left number of luggage items is greater than zero,
    wherein the notification comprises a request for a selection of a method of retrieval, and wherein the method of retrieval comprises retrieval via a locker system associated with a delivery vehicle, the locker system comprising a locker camera, a processor, and a memory comprising instructions that, when executed by the processor of the locker system, cause the processor of the locker system to perform operations including identifying the left number of luggage items, and confirming a number of the left number of luggage items by comparing identified items in an image of the locker camera with images of the left number of luggage items provided by a server associated with the vehicle.

2. The method of claim 1, wherein creating the first user account comprises:

capturing a third image of the first user by a second camera of a mobile device; and determining the one or more first stored facial features of the first user from the third image.

3. The method of claim 1, further comprising sending a ride request from the mobile device, the ride request comprising the pickup location and the dropoff location.

4. The method of claim 3, wherein the ride request further comprises a plurality of user accounts associated with the ride request, wherein each of the plurality of user accounts comprises one or more stored facial features, and wherein the first user account is identified from the plurality of user accounts.

5. The method of claim 1, wherein detecting the first user, detecting the first number of luggage items, and detecting the second number of luggage items are performed by an object detection module that comprises an object localization algorithm and an image classification algorithm.

6. A system, comprising:
a vehicle comprising a vehicle camera;
a delivery vehicle;
a locker system associated with the delivery vehicle, wherein the locker system comprises a locker that is configured to be unlocked with a code, a locker camera, a locker processor, and a locker memory, and wherein the locker system is disposed externally to the delivery vehicle;
a processor; and
a memory comprising instructions that, when executed by the processor, cause the processor to:
request a first image from the vehicle camera at a pickup location;
capture the first image by the vehicle camera at the pickup location;
identify a first user account, comprising one or more first stored facial features of a first user, based on the first image, the identification of the first user account comprising:
detecting, in the first image, the first user;
determining one or more first facial features of the first user from the first image; and
comparing the one or more first facial features of the first user to the one or more first stored facial features of the first user account,
wherein the first user account is created in association with the first user;
determine a first number of luggage items associated with the first user to add to the first user account, comprising:
determining, in the first image, the first user based on the one or more first facial features; and
detecting, in the first image, the first number of luggage items associated with the first user;
request a second image from the vehicle camera at a dropoff location;
capture the second image by the vehicle camera at the dropoff location;
identify the first user account based on the second image, comprising:
detecting, in the second image, the first user;
determining one or more second facial features of the first user from the second image; and
comparing the one or more second facial features of the first user to the one or more first stored facial features of the first user account; and subtracting a second number of luggage items associated with the first user from the first user account to determine a left number of luggage items, comprising:
determining, in the second image, the first user based on the one or more second facial features; and
detecting, in the second image, the second number of luggage items associated with the first user,
wherein the locker memory comprises instructions that, when executed by the locker processor, cause the locker processor to perform operations including identifying the left number of luggage items, and confirming a number of the left number of luggage items by comparing identified items in an image of the locker camera with images of the left number of luggage items provided by a server associated with the vehicle.

7. The system of claim 6, wherein the memory comprises a ride request, comprising the pickup location and the dropoff location.

8. The system of claim 7, wherein the ride request further comprises a plurality of user accounts associated with the ride request, wherein each of the plurality of user accounts comprises one or more stored facial features, and wherein the first user account is identified from the plurality of user accounts.

9. The system of claim 6, further comprising a database, comprising a plurality of user accounts, wherein each of the plurality of user accounts comprises one or more stored facial features.

10. The system of claim 6, wherein detecting the first user, detecting the first number of luggage items, and detecting the second number of luggage items are performed by an object detection module that comprises an object localization algorithm and an image classification algorithm.

11. The system of claim 6, wherein the memory further comprises instructions that, when executed by the processor, cause the processor to determine a left number of luggage items associated with the first user, wherein the left number of luggage items is equal to the first number of luggage items minus the second number of luggage items.

12. The system of claim 11, wherein the memory further comprises instructions that, when executed by the processor, cause the processor to send a notification if the left number of luggage items is greater than zero.

13. The system of claim 12, wherein the notification comprises a request for a selection of a method of retrieval.

14. The method of claim 1, wherein the locker system further comprises a robotic arm, and wherein the memory of the locker system further includes instructions that, when executed by the processor of the locker system, cause the processor of the locker system to perform the operation comprising causing the robotic arm to remove at least one of the left number of luggage items from the vehicle.

15. The method of claim 14, wherein the locker system comprises a plurality of storage lockers, and wherein causing the robotic arm to remove comprises placing each of the left number of luggage items in at least one of the number of storage lockers and locking the at least one of the number of storage lockers.

16. The method of claim 15, wherein the at least one of the number of storage lockers is associated with the first user account, and wherein the method further comprises unlocking the at least one of the number of storage lockers with a user interface of the locker system.

17. The method of claim 16, further comprising providing a code to the mobile device of the first user in order to allow the first user to access the at least one of the number of storage lockers via the user interface, and unlocking the at least one of the number of storage lockers by entering the code into the user interface to access the left number of luggage items.

18. The method of claim 17, wherein the code is a QR code.

19. The system of claim 6, wherein the locker system further comprises a robotic arm, wherein the locker memory further includes instructions that, when executed by the locker processor, cause the locker processor to perform the operation comprising causing the robotic arm to remove at least one of the left number of luggage items from the vehicle, wherein the locker system comprises a plurality of storage lockers, wherein causing the robotic arm to remove comprises placing each of the left number of luggage items in at least one of the number of storage lockers and locking the at least one of the number of storage lockers, wherein the at least one of the number of storage lockers is associated with the first user account, and wherein the locker memory further includes instructions that, when executed by the locker processor, cause the locker processor to perform the operation comprising unlocking the at least one of the number of storage lockers with a user interface of the locker system.

* * * * *